US007697549B2

(12) United States Patent
Eran (10) Patent No.: US 7,697,549 B2
(45) Date of Patent: Apr. 13, 2010

(54) WIRELESS LAN CONTROL OVER A WIRED NETWORK

(75) Inventor: Shpak Eran, Tel Aviv (IL)

(73) Assignee: Extricom Ltd., Tel Aviv (IL)

( * ) Notice: Subject to any disclaimer, the term of this patent is extended or adjusted under 35 U.S.C. 154(b) by 681 days.

(21) Appl. No.: 10/764,963

(22) Filed: Jan. 26, 2004

(65) Prior Publication Data

US 2004/0156399 A1 Aug. 12, 2004

Related U.S. Application Data

(63) Continuation-in-part of application No. 10/664,631, filed on Sep. 19, 2003, which is a continuation-in-part of application No. 10/214,271, filed on Aug. 7, 2002.

(51) Int. Cl.
*H04L 12/28* (2006.01)
*H04W 4/00* (2009.01)

(52) U.S. Cl. .................. 370/401; 370/338; 370/913

(58) Field of Classification Search ................ 370/338, 370/913, 400, 401, 336, 468, 392
See application file for complete search history.

(56) References Cited

U.S. PATENT DOCUMENTS

| | | | |
|---|---|---|---|
| 4,935,925 A | 6/1990 | Williams et al. | |
| 5,280,472 A | 1/1994 | Gilhousen et al. | |
| 5,570,352 A | 10/1996 | Poyhonen | |
| 5,644,576 A | 7/1997 | Bauchot et al. | |
| 5,787,085 A | * | 7/1998 | Fox ........................... 370/392 |
| 5,825,758 A | 10/1998 | Heikkinen et al. | |
| 5,842,117 A | 11/1998 | Rosenberg et al. | |

(Continued)

FOREIGN PATENT DOCUMENTS

EP 1 134 935 9/2001

(Continued)

OTHER PUBLICATIONS

IEEE Draft Supplement 802.11h, "Spectrum and Transmit Power Management Extensions in the 5 GHz Band in Europe", Publication P802.11h/D2.1 of the IEEE Standards Department, Piscataway, New Jersey, Jul. 2002.

(Continued)

*Primary Examiner*—George Eng
*Assistant Examiner*—Christopher M Brandt
(74) *Attorney, Agent, or Firm*—Husch Blackwell Sanders LLP Welsh & Katz (57) ABSTRACT

Apparatus for mobile communication includes a switch and a plurality of access points, which are arranged in a wireless local area network (WLAN) to communicate over the air on a common frequency channel with a mobile station using a common basic service set identification (BSSID) for all the access points. The access points are coupled by a LAN to the switch so that upon receiving at one or more of the access points an uplink signal transmitted over the WLAN by the mobile station on the common frequency channel, the one or more of the access points convey messages responsively to the uplink signal over the LAN to the switch. A manager node is coupled to the switch so as to receive the messages and is adapted to process the messages so as to select one of the access points to respond to the uplink signal.

52 Claims, 3 Drawing Sheets

U.S. PATENT DOCUMENTS

| | | | |
|---|---|---|---|
| 5,923,702 A | 7/1999 | Brenner et al. | |
| 5,960,344 A | 9/1999 | Mahany | |
| 5,982,779 A | 11/1999 | Krishnakumar et al. | |
| 6,028,866 A | 2/2000 | Engel et al. | |
| 6,047,175 A | 4/2000 | Trompower | |
| 6,097,705 A | 8/2000 | Ben-Michael et al. | |
| 6,192,026 B1 | 2/2001 | Pollack et al. | |
| 6,196,456 B1 | 3/2001 | Taylor | |
| 6,259,898 B1 | 7/2001 | Lewis | |
| 6,295,461 B1* | 9/2001 | Palmer et al. | 455/557 |
| 6,393,261 B1 | 5/2002 | Lewis | |
| 6,463,303 B1 | 10/2002 | Zhao | |
| 6,505,045 B1 | 1/2003 | Hills et al. | |
| 6,529,164 B1 | 3/2003 | Carter | |
| 6,560,448 B1 | 5/2003 | Baldwin et al. | |
| 6,567,396 B1 | 5/2003 | Pohjanvouri et al. | |
| 6,580,704 B1 | 6/2003 | Wellig et al. | |
| 6,590,884 B1 | 7/2003 | Panasik | |
| 6,636,737 B1 | 10/2003 | Hills et al. | |
| 6,671,284 B1 | 12/2003 | Yonge et al. | |
| 6,671,495 B1 | 12/2003 | Lappetelainen et al. | |
| 6,674,403 B2 | 1/2004 | Gray et al. | |
| 6,675,015 B1* | 1/2004 | Martini et al. | 455/436 |
| 6,690,943 B1 | 2/2004 | Forde et al. | |
| 6,711,148 B1 | 3/2004 | Hills | |
| 6,732,163 B1 | 5/2004 | Halasz | |
| 6,799,054 B2 | 9/2004 | Shpak | |
| 6,870,822 B2 | 3/2005 | Balogh | |
| 6,907,229 B2 | 6/2005 | Shpak | |
| 6,917,804 B2 | 7/2005 | Takayama et al. | |
| 6,947,483 B2 | 9/2005 | Engwer | |
| 6,965,942 B1 | 11/2005 | Young et al. | |
| 6,968,198 B2 | 11/2005 | Nylund | |
| 7,016,328 B2 | 3/2006 | Chari et al. | |
| 7,028,186 B1 | 4/2006 | Stenman et al. | |
| 7,046,690 B2 | 5/2006 | Sherman | |
| 7,054,627 B1 | 5/2006 | Hillman | |
| 7,113,498 B2 | 9/2006 | Bajic | |
| 7,151,795 B1 | 12/2006 | Goldburg | |
| 7,173,922 B2* | 2/2007 | Beach | 370/338 |
| 7,184,407 B1 | 2/2007 | Myles et al. | |
| 7,230,920 B1* | 6/2007 | Stratigakis | 370/230 |
| 7,391,757 B2 | 6/2008 | Haddad et al. | |
| 2001/0055283 A1 | 12/2001 | Beach | |
| 2002/0009982 A1 | 1/2002 | Kim | |
| 2002/0048368 A1 | 4/2002 | Gardner | |
| 2002/0061024 A1 | 5/2002 | Malkemes et al. | |
| 2002/0080754 A1 | 6/2002 | Travostino et al. | |
| 2002/0085719 A1 | 7/2002 | Crosbie | |
| 2002/0093929 A1* | 7/2002 | Mangold et al. | 370/336 |
| 2002/0114303 A1* | 8/2002 | Crosbie et al. | 370/338 |
| 2002/0136183 A1* | 9/2002 | Chen et al. | 370/338 |
| 2002/0150098 A1* | 10/2002 | Sharony | 370/390 |
| 2002/0176386 A1* | 11/2002 | Singh | 370/338 |
| 2002/0188723 A1 | 12/2002 | Choi et al. | |
| 2002/0197984 A1 | 12/2002 | Monin et al. | |
| 2003/0003912 A1 | 1/2003 | Melpignano et al. | |
| 2003/0007475 A1 | 1/2003 | Tsuda et al. | |
| 2003/0012174 A1 | 1/2003 | Bender et al. | |
| 2003/0014624 A1 | 1/2003 | Maturana et al. | |
| 2003/0063593 A1 | 4/2003 | Koyanagi et al. | |
| 2003/0117973 A1 | 6/2003 | Thermond et al. | |
| 2003/0133422 A1 | 7/2003 | Bims | |
| 2003/0137959 A1* | 7/2003 | Nebiker et al. | 370/338 |
| 2003/0161340 A1* | 8/2003 | Sherman | 370/445 |
| 2003/0174681 A1 | 9/2003 | Gilberton et al. | |
| 2003/0181221 A1 | 9/2003 | Nguyen | |
| 2003/0193946 A1* | 10/2003 | Gernert et al. | 370/389 |
| 2003/0210674 A1 | 11/2003 | Honkasalo et al. | |
| 2003/0227892 A1* | 12/2003 | Cabana | 370/338 |
| 2003/0227893 A1* | 12/2003 | Bajic | 370/338 |
| 2003/0235170 A1* | 12/2003 | Trainin | 370/338 |
| 2004/0013135 A1 | 1/2004 | Haddad | |
| 2004/0022176 A1 | 2/2004 | Hashimoto et al. | |
| 2004/0052241 A1 | 3/2004 | Martin et al. | |
| 2004/0063455 A1 | 4/2004 | Eran et al. | |
| 2004/0076134 A1* | 4/2004 | Barber et al. | 370/338 |
| 2004/0103204 A1 | 5/2004 | Yegin | |
| 2004/0141522 A1 | 7/2004 | Texerman et al. | |
| 2004/0157624 A1 | 8/2004 | Hrastar | |
| 2004/0170154 A1 | 9/2004 | Carter et al. | |
| 2004/0203740 A1 | 10/2004 | Won et al. | |
| 2004/0204105 A1 | 10/2004 | Liang et al. | |
| 2004/0223469 A1 | 11/2004 | Bahl et al. | |
| 2004/0252696 A1 | 12/2004 | Kakishima et al. | |
| 2004/0267896 A1* | 12/2004 | Patel et al. | 709/217 |
| 2005/0018630 A1 | 1/2005 | Bianchi et al. | |
| 2005/0021586 A1 | 1/2005 | Bichot et al. | |
| 2005/0054370 A1 | 3/2005 | Shpak | |
| 2005/0063349 A1 | 3/2005 | LoGalbo et al. | |
| 2005/0117524 A1 | 6/2005 | Lee et al. | |
| 2005/0170824 A1 | 8/2005 | Dowling | |
| 2005/0180314 A1 | 8/2005 | Webster et al. | |
| 2006/0025150 A1 | 2/2006 | Kim et al. | |
| 2006/0203772 A1 | 9/2006 | Laroia et al. | |

FOREIGN PATENT DOCUMENTS

| | | |
|---|---|---|
| JP | 63009332 A | 1/1988 |
| JP | 2001016163 A | 1/2001 |
| WO | WO 01/63842 | 8/2001 |
| WO | WO 02/071627 A2 | 9/2002 |

OTHER PUBLICATIONS

ANSI/IEEE Standard 801.11 (1999 Edition), Part 11: Wireless LAN Medium Access Control (MAC) and Physical Layer (PHY) Specifications.

Japanese Patent Application No. 2006502640 Official Action dated Aug. 18, 2009.

U.S. Appl. No. 11/202,256 Official Action dated Jul. 7, 2009.

* cited by examiner

WIRELESS LAN CONTROL OVER A WIRED NETWORK

CROSS-REFERENCE TO RELATED APPLICATION

This application is a continuation-in-part of U.S. patent application Ser. No. 10/664,631, filed Sep. 19, 2003, which is a continuation-in-part of U.S. patent application Ser. No. 10/214,271, filed Aug. 7, 2002. Both of these related applications are assigned to the assignee of the present patent application, and their disclosures are incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1-2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer high communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point in a conventional 802.11 WLAN).

The natural response to these practical difficulties would be to distribute a greater number of access points within the area to be served. If a WLAN receiver receives signals simultaneously from two sources of similar strength on the same frequency channel, however, it is generally unable to decipher either signal. The 802.11 standard provides a mechanism for collision avoidance known as clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three different frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

U.S. Patent Application Publication US 2003/0133422 A1, to Bims, whose disclosure is incorporated herein by reference, describes a communication system in which packets transmitted over the air by a mobile station are received by multiple repeaters. The repeaters are coupled to a switch via a wired connection. In a disclosed embodiment, the repeaters are connected to the switch via an Ethernet LAN and exchange packets with mobile stations using the 802.11 protocol. Some of the MAC (medium access control) functionality that is typically associated with access points in a 802.11 WLAN is taken out of the repeaters and centralized in the switch. Specifically, the MAC layer is split to enable transfer of messages over wiring such as CAT5 LAN cabling.

Each repeater that receives a packet from a mobile station without error determines the received signal strength, and forwards the packet along with a received signal strength indicator (RSSI) to the switch. The RSSI is used in determining which repeater should send an acknowledgment to the mobile station. This architecture is said to allow for overlapping coverage between cells supported by the repeaters.

SUMMARY OF THE INVENTION

The present invention provides methods and devices for enhancing the coverage and speed of WLAN systems, and particularly of WLAN systems that are built around a wired LAN infrastructure. In embodiments of the present invention, a WLAN system comprises multiple wireless access points, which are distributed within a service region and are linked by a wired LAN. The access points communicate with mobile stations in the service region in accordance with one or more of the 802.11 standards. In order to provide complete coverage of the service region, with strong communication signals throughout the region, the access points may be closely spaced, and their areas of coverage may substantially overlap one another.

An access point manager node on the LAN coordinates and controls the operations of the access points, as described hereinbelow. The access points communicate with the manager node via a switch in the LAN. Novel techniques provided by the present invention enable low-latency communication between the access points and manager over the LAN. These techniques permit the access points to interact with the mobile stations, under control of the manager, within the tight timing constraints of 802.11 protocols, notwithstanding the inherently high latency of wired LANs (even Gigabit Ethernet LANs) that are known in the art. The WLAN system is thus able to accommodate conventional, 802.11-compliant mobile stations substantially without modification.

In some embodiments of the present invention, all the access points that operate on a given frequency channel within a given service region of the WLAN system belong to the same basic service set (BSS) and thus share the same BSS identification (BSSID). (By contrast, in 802.11 WLAN systems known in the art, each BSS includes only a single access point.) Therefore, in these embodiments, any of the access points that are within range of a given mobile station are capable of receiving and responding to uplink messages from the mobile station. These access points forward all uplink management and broadcast messages over the LAN, via the switch, to the access point manager, which selects one of the access points to respond to the mobile station and to receive subsequent data messages from the mobile station. The access point manager assigns one access point to serve each mobile station in the WLAN. Problems of overlapping coverage areas and collisions are thus resolved. The access points may therefore be deployed within the service region as closely as desired, so that mobile stations everywhere in the service region experience good radio coverage and can operate at optimal speed.

Although the embodiments described herein make reference to the 802.11 family of wireless standards and use terminology taken from these standards, the principles of the present invention may similarly be applied in wireless LANs of other types, based on other standards and communication protocols. Similarly, although these embodiments are built around Ethernet LANs, and particularly Gigabit Ethernet LANs, the principles of the present invention may likewise be applied using LANs of other types for communication between the access points and manager node.

There is therefore provided, in accordance with an embodiment of the present invention, apparatus for mobile communication, including:

a switch, having a plurality of ports for connection to a wired local area network (LAN);

a plurality of access points, which are arranged in a wireless local area network (WLAN) to communicate over the air on a common frequency channel with a mobile station using a common basic service set identification (BSSID) for all the access points, and which are coupled by the LAN to the switch so that upon receiving at one or more of the access points an uplink signal transmitted over the WLAN by the mobile station on the common frequency channel, the one or more of the access points convey messages responsively to the uplink signal over the LAN to the switch; and a manager node, which is coupled to the switch so as to receive the messages and is adapted to process the messages so as to select one of the access points to respond to the uplink signal, and to send an instruction via the switch to the selected one of the access points to transmit a response to the mobile station.

Typically, the access points have respective service areas, and are arranged so that the service areas substantially overlap.

In disclosed embodiments, the access points are configured to communicate with the mobile station substantially in accordance with IEEE Standard 802.11, and the LAN is an Ethernet LAN. In one embodiment, the LAN is characterized by a data transmission rate of at least 1 Gbps. In another embodiment, the LAN is characterized by a data transmission rate that is substantially less than 1 Gbps.

In disclosed embodiments, the manager node has an address on the LAN, and the access points are adapted to convey the messages over the LAN in the form of data frames directed to the address of the manager node. Typically, the access points are configured to communicate over the LAN exclusively with the manager node.

In some embodiments, the access points are adapted to receive an uplink data packet sent by the mobile station using the uplink signal, and to fragment the uplink data packet among a succession of the data frames for conveyance over the LAN via the switch to the manager node. Typically, the access points are operative to fragment the uplink data packet so that the data frames have a length that is no more than 10% of a maximum frame length permitted on the LAN. Additionally or alternatively, the access points are operative to fragment the uplink data packet so that the data frames have a length that is equal to a minimum frame length permitted on the LAN.

Typically, the uplink data packet includes a destination address, and the manager node is adapted to reassemble the uplink data packet from the succession of the data frames, and to convey the reassembled packet via the switch over the LAN to the destination address. In a disclosed embodiment, the manager node is connected to first and second ports among the plurality of the ports of the switch, and is configured to receive the data frames from the access points through the first port and to convey the reassembled packet to the LAN via the second port. The manager node may be further configured to receive a downlink data packet from the LAN via the second port, and to fragment the downlink data packet into a further succession of the data frames and to convey the further succession of the data frames via the first port to the selected one of the access points, which is operative to reassemble the downlink data packet for transmission over the WLAN to the mobile station.

In one embodiment, the address of the manager node on the LAN includes a Layer 3 address, and each of the succession of the data frames among which the uplink data packet is fragmented includes a Layer 3 encapsulating packet, having a destination address corresponding to the Layer 3 address of the manager node.

Typically, the messages conveyed by the access points responsively to the uplink signal include an indication of a strength of the uplink signal received respectively by each of the one or more of the access points, and the manager node is adapted to select, responsively to the indication and prior to receiving the messages from all of the one or more of the access points, the one of the access points to respond to the uplink signal. The access points may be adapted to set, responsively to the strength of the uplink signal, a priority indicator in the messages to be conveyed over the LAN so as to cause the switch to deliver a first message indicating a strong uplink signal before delivering a second message indicating a weak uplink signal. Additionally or alternatively, the access points may be adapted, responsively to the strength of the uplink signal, to delay transmission of some of the messages over the LAN, so that a first message indicating a strong uplink signal is transmitted with a smaller delay than a second message indicating a weak uplink signal.

There is also provided, in accordance with an embodiment of the present invention, apparatus for mobile communication, including:

a switch, having a plurality of ports for connection to a wired local area network (LAN);

a plurality of access points, which are arranged in a wireless local area network (WLAN) to communicate over the air with a mobile station, and which are coupled by the LAN to the switch so that upon receiving at one or more of the access points an uplink message transmitted over the WLAN by the mobile station, the one or more of the access points convey the uplink message over the LAN to the switch; and a manager node, which is connected to first and second ports among the plurality of ports of the switch, and is configured to receive the uplink message from the access points through the first port and to convey the uplink message via the second port over the LAN to a destination address of the message.

In a disclosed embodiment, the manager node has first and second addresses on the LAN, which are respectively associated with the first and second ports, and the access points are adapted to convey the uplink message over the LAN in the form of data frames directed to the first address. Typically, the uplink message includes a data packet, and the access points are adapted to fragment the uplink data packet among a succession of the data frames for conveyance over the LAN to the first address, and the manager node is adapted to reassemble the data packet from the succession of the data frames, and to convey the reassembled data packet via the second port over the LAN to the destination address, using the second address as a source address.

Additionally or alternatively, the manager node is further configured to receive a downlink message from the LAN via the second port, and to convey the downlink message via the first port to one of the access points, which is operative to transmit the downlink message over the WLAN to the mobile station.

There is additionally provided, in accordance with an embodiment of the present invention, a method for mobile communication, including:

arranging a plurality of access points in a wireless local area network (WLAN) to communicate over the air with a mobile station using a common basic service set identification (BSSID) for all the access points;

receiving at one or more of the access points an uplink signal transmitted over the WLAN by the mobile station using the common BSSID;

conveying messages responsively to the uplink signal from the one or more of the access points over a wired local area network (LAN) linking the access points to a manager node;

processing the messages at the manager node so as to select one of the access points to respond to the uplink signal, and conveying a response instruction from the manager node to the selected one of the access points; and transmitting a response from the selected one of the access points to the mobile station responsively to the response instruction.

There is further provided, in accordance with an embodiment of the present invention, a method for mobile communication, including:

coupling a manager node to first and second ports among a plurality of ports of a switch in a wired local area network (LAN);

arranging a plurality of access points in a wireless local area network (WLAN) to communicate over the air with a mobile station;

receiving at one or more of the access points an uplink message transmitted over the WLAN by the mobile station, the uplink message containing a destination address;

passing the uplink message from the one or more of the access points over the LAN to the manager node via the first port of the switch; and conveying the uplink message from the manager node via the second port over the LAN to the destination address.

The present invention will be more fully understood from the following detailed description of the embodiments thereof, taken together with the drawings in which:

DETAILED DESCRIPTION OF EMBODIMENTS

Figure 1:
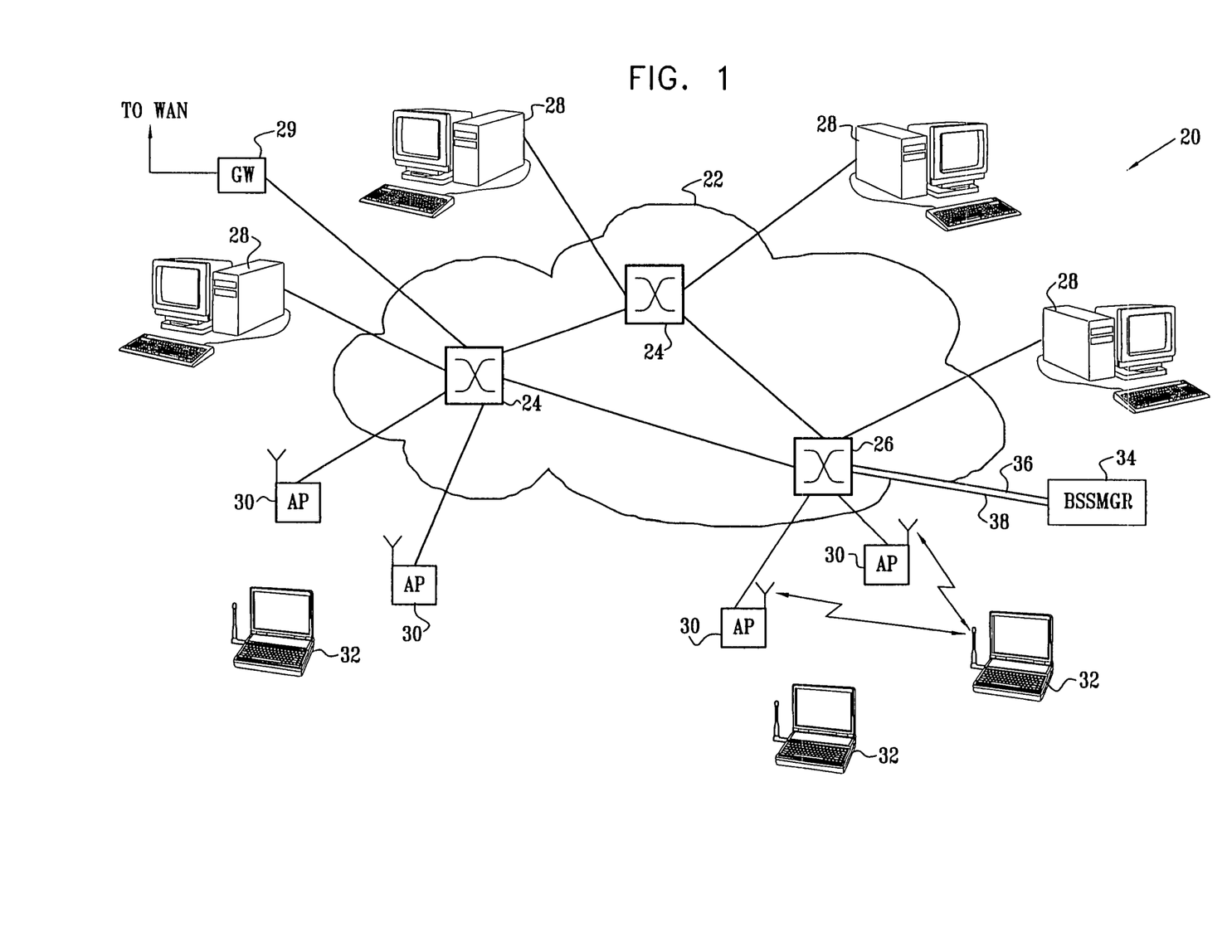
FIG. 1 is a block diagram that schematically illustrates a WLAN system, in accordance with a preferred embodiment of the present invention.

FIG. 1 is a block diagram that schematically illustrates a wireless LAN (WLAN) system 20, in accordance with an embodiment of the present invention. System 20 is built around a wired LAN 22, comprising LAN switches 24, 26. Although three switches are shown here by way of example, in practice LAN 22 may comprise a larger or smaller number of switches, in substantially any topology known in the art. Typically, LAN 22 comprises an Ethernet LAN, in accordance with one of the IEEE 802.3 standards. Preferably, for the purposes of the present embodiment, the LAN has a characteristic data rate of at least 1 Gbps, as provided, for instance, by Gigabit Ethernet LANs. Alternatively, system 20 may be built around a lower-speed LAN, such as a 100 Mbps Ethernet LAN. In either case, embodiments of the present invention provide novel methods for reducing latency of communication over LAN 22 between WLAN elements, as described below, in order to meet the tight timing requirements of the WLAN while using standard LAN switches 24, 26 substantially without modification.

LAN 22 may be a general-purpose LAN, which in addition to its novel WLAN-related functions (as described below), also serves fixed computers 28, such as servers and/or workstations. For example, LAN 22 may be part of an existing enterprise or campus network and need not have any special or non-standard properties in order to serve WLAN system 20. LAN 22 is typically connected to other wired networks via one or more gateways 29, as are known in the art.

As a further alternative, switches 24, 26 may comprise Layer 3 switches, i.e., routers, such as Internet Protocol (IP) routers. Although certain aspects of implementation of system 20 are described hereinbelow with particular reference to Layer 2 (Ethernet) LAN functions, modification of the implementation for Layer 3 operation will be apparent to those skilled in the art. Some of the specific changes in implementation that are required for Layer 3 operation are pointed out in the description below.

WLAN system 20 comprises multiple access points 30, which are configured for data communication with mobile stations 32. The mobile stations typically comprise computing devices, such as desktop, portable or handheld devices. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in *Part 11: Wireless LAN Medium Access Control (MAC) and Physical Layer (PHY) Specifications*, which is incorporated herein by reference. The principles of the present invention, however, are not limited to the 802.11 standards, and may likewise be applied to substantially any type of WLAN, including HiperLAN, Bluetooth and hiswan-based systems.

Access points 30 are connected by LAN 22, which serves as the distribution system (DS) for the WLAN system. In other words, each of the access points is connected to a respective port of one of switches 24, 26 and has an assigned Ethernet MAC address on the LAN. The LAN connects the access points to a node that serves as an access point manager 34, which is also referred to hereinbelow as a BSS manager (BSSMGR). Manager 34 typically comprises a computer, operating under the control of software suitable for carrying out the functions described hereinbelow. The software may be downloaded to manager 34 in electronic form, or it may alternatively be provided on tangible media, such as CD-ROM. Alternatively or additionally, manager 34 may comprise dedicated hardware circuits in order to accelerate the performance of its functions.

Typically, for reasons explained further hereinbelow, manager 34 is connected to two ports 36 and 38 of switch 26, and accordingly has two MAC addresses. Port 38 is used for low-latency communication with access points 30, using a novel fragmentation and encapsulation protocol described below. Port 36 is used for high-throughput data transfer to and from other nodes on LAN 22, including gateway 29. Manager 34 thus has two MAC addresses on LAN 22—one associated with port 38 for communication with access points 30, and another associated with port 36 for communication with other nodes. Access points 30 are typically configured to communicate over LAN 22 exclusively with manager 34 via port 38. Thus all traffic on LAN 22 to and from the access points (and thus to and from mobile stations 32) passes through manager 34, rather than going directly through switch 26.

Although manager 34 is shown and described here as a single unit, in practice, the functions of the manager may be divided among two or more units, which may occupy separate nodes in system 20. For example, as described in the above-mentioned U.S. patent application Ser. No. 10/664,631, manager 34 may be split into two logical entities: a control processor for handling management traffic (such as the association process, access point selection and handovers, as described hereinbelow), and a packet processor for handling data traffic to and from access points 30. The packet processor (whether integrated with or separate from the control processor) may also perform packet encryption and decryption functions, which are typically performed by the access points themselves in WLAN systems known in the art. The control processor and packet processor may be contained physically in a single box or in separate boxes. Alternatively or additionally, the control processor and/or packet processor may be physically integrated, in the form of one or more plug-in boards, for example, with switch 26 or with another node on LAN 22.

Furthermore, some or all of the functions of manager 34 may be distributed among a plurality of manager nodes or packet processors. For example, another manager node (not shown) may be connected to one of switches 24. This distributed functionality has the potential advantages of redundancy, making system 20 immune to a single point of failure, and reduced bandwidth requirements, by splitting packet traffic among different processors. When multiple packet processors are used, for example, each mobile station 32 may be assigned to one of the packet processors in order to balance the computational load among the processors. This assignment of packet processors to mobile stations may be performed by a single control processor, which then informs access points 30 of the packet processor node that is assigned to serve each mobile station.

Notwithstanding the possibilities of functional and physical separation of manager 34 into multiple separate units or of integration of manager 34 with other network nodes, in the embodiments described below manager 34 is treated as a single functional unit for the sake of conceptual simplicity and clarity.

Access points 30 in system 20 are preferably closely spaced, operate on a common frequency channel, and share a common BSSID. For increased capacity, system 20 may include other, similar groups of access points (not shown in the figure), operating on other frequency channels, to the extent permitted by the applicable WLAN standard and regulatory regulations. Each of these groups has its own BSSID and operates in a manner substantially identical to that described hereinbelow with respect to access points 30. These other groups of access points may be connected to the same LAN 22 and may be managed by the same manager 34, or they may be managed independently by another manager. In any case, because they operate on different frequency channels, the different groups of access points are substantially independent of one another and may be regarded as separate systems. It is therefore sufficient to describe the operation of a single group, as shown in FIG. 1, in order to provide an understanding of the present invention.

Since access points 30 operate on the same frequency channel, radio waves may typically reach mobile station 32 from multiple access points simultaneously on this frequency channel. By the same token, uplink radio messages transmitted by mobile station 32 may be received at about the same time by multiple access points. In conventional WLAN systems, under these circumstances, mobile station 32 would receive downlink acknowledgment and response messages from two or more of the access points, which would probably result in inability of the mobile station to communicate with any of the access points. In embodiments of the present invention, manager 34 resolves this conflict by selecting one of access points 30 a priori to communicate with each mobile station (usually—though not necessarily—the closest access point to the mobile station, meaning the access point that received the uplink signal with the highest signal strength). Manager 34 conveys response instructions to the selected access point over LAN 22, as described hereinbelow. The other access points meanwhile refrain from interfering.

Implementing this mode of operation requires modifying the behavior of the access points, relative to conventional 802.11 access points. The 802.11 standard provides that an access point should acknowledge and respond to all uplink messages that are directed to the BSSID of the access point. Thus, if access points 30 were configured in the conventional manner, all the access points would acknowledge the uplink messages from mobile stations 32, without waiting for instructions from manager 34.

To overcome this limitation, access points 22 may be configured to emulate mobile stations and, for this purpose, may be assigned their own, unique WLAN MAC addresses. Some off-shelf WLAN interface chips, such as WLAN chipsets produce by Atheros Communications (Sunnyvale, Calif.), permit this reconfiguration to be carried out by an appropriate firmware command to the chip. When configured to emulate mobile stations in this manner, each access point 30 acknowledges uplink data messages only when the data messages are directed to its assigned MAC address. The access point passes all these data messages over LAN 22 to manager 34 via port 38 (the low-latency port) on switch 26, after fragmenting and encapsulating the messages in the manner described below. The access point in this configuration ignores uplink data messages that are directed to other MAC addresses, except to measure the signal strengths of these uplink transmissions, as is also described below. The access point still receives and passes on control and management uplink messages over LAN 22 to manager 34, however, since these messages contain a special MAC address, equal to the BSSID of the access point.

The use of conventional WLAN hardware to achieve the novel functionality of the present invention is generally advantageous in reducing the cost of system 20. Alternatively or additionally, access points 30 may comprise custom or semi-custom hardware, designed for the purposes of the present invention. For example, some or all of the MAC-layer functions of manager 34 may be performed by a field-programmable gate array (FPGA), which may be programmed in the manner described in U.S. patent application Ser. No. 10/699,258, filed Oct. 30, 2003. This patent application is assigned to the assignee of the present patent application, and its disclosure is incorporated herein by reference. Other implementations will be apparent to those skilled in the art. In any case, the novel operation of access points 30 and manager 34 is transparent to mobile stations 32, which operate in accordance with the 802.11 standard without modification.

Figure 2A:
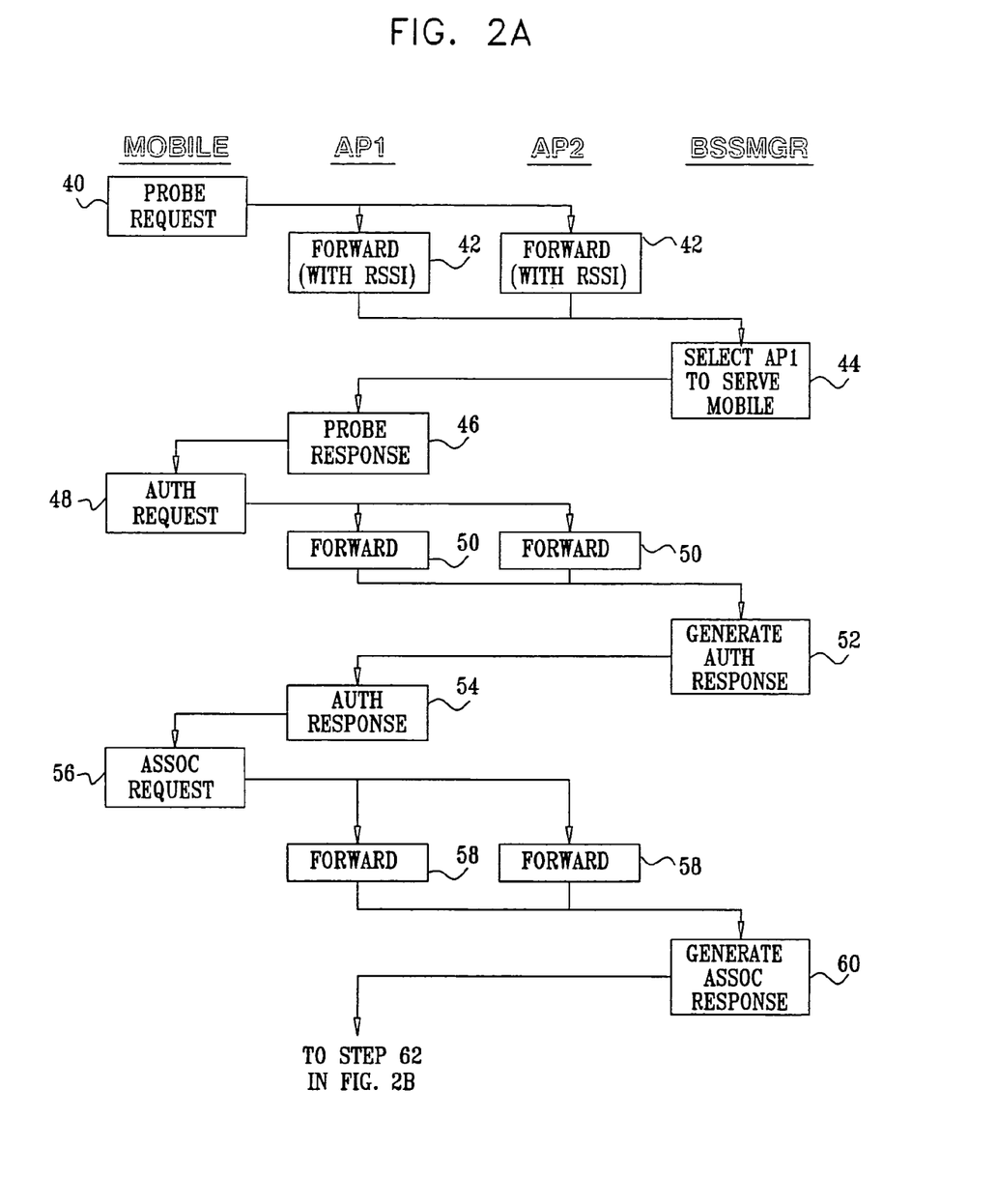
FIGS. 2A and 2B are flow charts that schematically illustrate a method for communication between a mobile station and access points in a WLAN system, in accordance with an embodiment of the present invention.
Figure 2B:
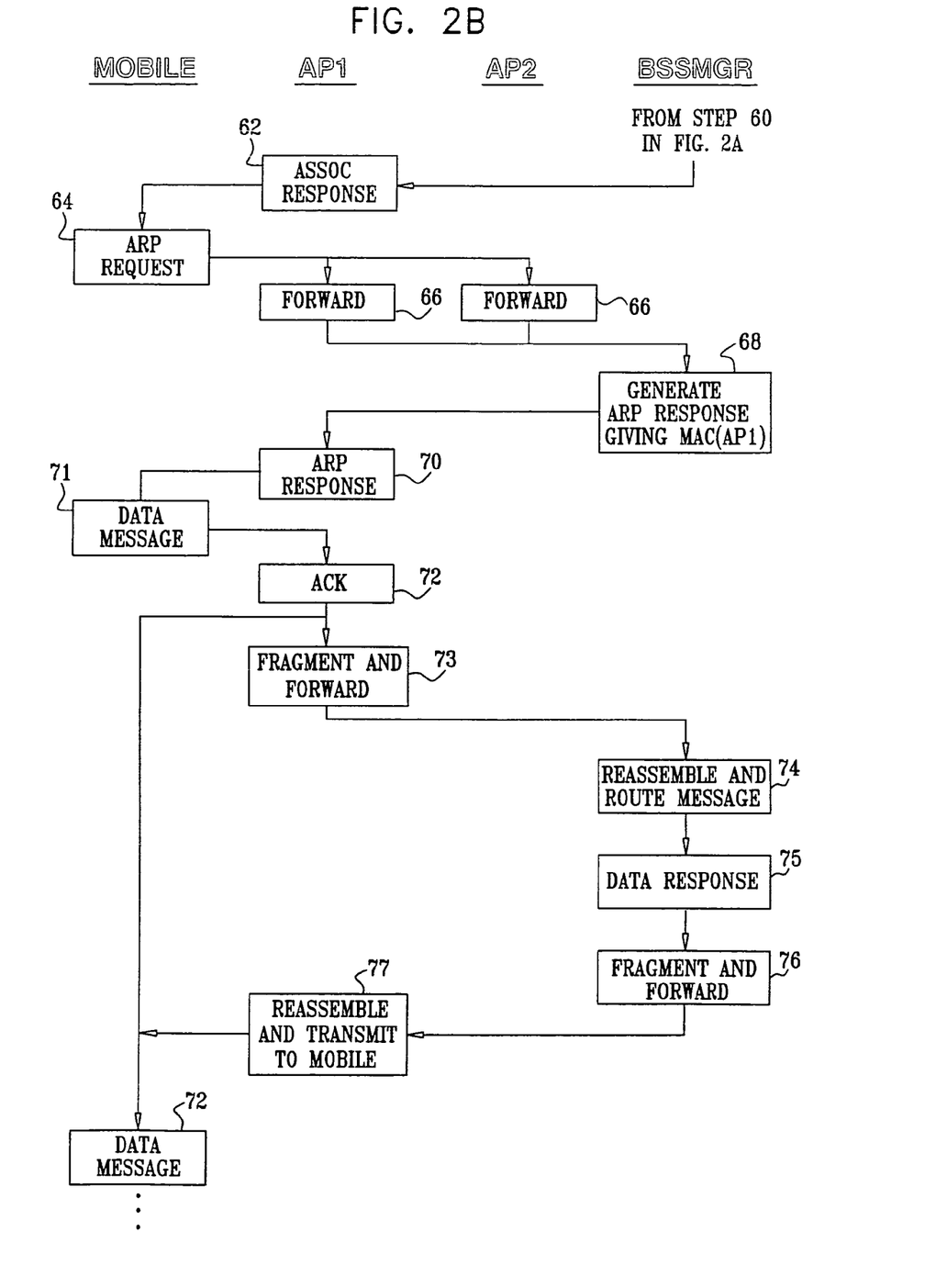

FIGS. 2A and 2B are a flow chart that schematically illustrates communication between mobile station 32 and access points 30 in system 20, in accordance with an embodiment of the present invention. The flow chart is arranged to show the sequence of messages and associated actions performed by the mobile station, by two access points (identified arbitrarily AP1 and AP2), and by manager 34 (BSSMGR). For the sake of simplicity, only these two access points are represented in this figure, and AP1 is selected by manager 34 to respond to mobile station 32. In practice, this method is typically carried out over a larger group of access points.

Communication between mobile station 32 and access points 30 under the 802.11 standard begins with a probe request 40, in order to identify available access points to which the mobile station may connect. The access points then forward the probe request to manager 34, at a forwarding step 42. Each access point encapsulates the probe request message, as well as the further messages described below, in a conventional Ethernet data frame, with its own LAN MAC address as the source address, and the MAC address of manager 34 that is associated with port 38 as the destination address. When access points 30 must communicate with manager 34 through a Layer 3 (IP) switch, the probe request message (and subsequent messages) is encapsulated in an IP packet, with the IP address of the access point as the source address and the IP address of manager 34 as the destination address.

The access points that receive the probe request typically measure the strength of the signal. Optionally, the access points forward a received signal strength indication (RSSI) to manager 34 together with the probe request. Alternatively, RSSI measurements may be sent periodically, and not for every packet received, in order to reduce bandwidth consumption on LAN 22.

Manager 34 selects an access point (AP1 in the present example) to respond to mobile station 32, at an access point selection step 44. Typically, the access point reporting the strongest RSSI for a given mobile station is in the best position to communicate with that mobile station at the highest supportable data rate, and the manager therefore chooses this access point to respond to the mobile station. In order to minimize the time required for manager 34 to determine which of the access points has the strongest RSSI, the reporting frames sent by the access points over LAN 22 are preferably prioritized according to RSSI strength. Various mechanisms may be used to achieve the desired prioritization, for example:

Access points 30 may add a priority indication, such as a Quality of Service (QoS) tag, to the frames that they transmit over LAN 22. For instance, IEEE 802.1p (which is a part of the IEEE 802.1D: ISO/IEC 15802-3 [MAC Bridges] standard) specifies the addition of a three-bit service priority field to the Ethernet header. Each access point determines the value to insert in this field depending on the RSSI reading: the stronger the RSSI, the higher the priority of the reporting frame. When switch 26 receives reporting frames from multiple access points simultaneously, it will pass the frame with the highest priority—and hence the strongest RSSI—to manager 34 before the other reporting frames.

To ensure that the frame reporting the strongest RSSI is the first to reach switch 26, access points 30 may back off transmission of reporting frames with weaker RSSI. Upon receiving an uplink signal from mobile station 32 with the strongest RSSI level, the receiving access point will send a reporting frame immediately. If the RSSI value is intermediate, the access point will delay transmission of the reporting frame by a short time, typically 1 μs. If the RSSI value is still weaker, the transmission delay may be even longer, such as 2 μs. Since the propagation delay over the air from mobile stations 32 to access points 30 typically varies by no more than 100 ns, this back-off scheme will generally ensure that the frame with strongest RSSI will be the first to reach switch 26, and thus the first to reach manager 34.

As a result of these prioritization methods, manager 34 is typically able to select the access point that is to respond to mobile station 32 based on the first RSSI reporting frame that it receives, and need not wait to compare the RSSI values reported by different access points. This rapid selection is important in meeting the timing constraints imposed by the 802.11 standards, as described further hereinbelow.

To reduce still further the latency of response to the uplink message, the access points may report their RSSI values in separate reporting frames, prior to forwarding the actual uplink message at step 42 (and at subsequent forwarding steps described hereinbelow). The access points may be programmed to make their RSSI measurements based only on the initial bits of the uplink message, and thus to send their RSSI reporting frames immediately, even before receiving the entire uplink message. In this manner, manager 34 may be able to select the access point that is to respond to the uplink message while the mobile station is still transmitting the message. These methods for expediting communication between the access points and manager are useful especially when LAN 22 operates at a relatively low speed, such as 100 Mbps, but they are also useful even in high-speed LANs.

Alternatively, manager 34 may initially select at random the access point that is to respond to probe request 40, and may subsequently appoint a new access point to communicate with the mobile station based on the RSSI.

As noted above, the access points typically measure the strength of the signal for every uplink packet they receive, and then periodically transmit the updated RSSI measurements to manager 34, which may lead the manager to change the access point that is selected to respond to a given mobile station. Alternatively or additionally, the manager may take other factors into consideration, such as load balancing among the access points, in order to select the access point to respond in each case. In any case, selection of the access point in this manner, from among access points closely within the service region of system 20, allows the mobile stations to communicate over the WLAN system with generally better signal quality, and therefore higher data rates, than in WLAN systems known in the art.

Upon selecting access point AP1 to respond to the probe request at step 44, manager 34 generates an appropriate response and conveys the response to the selected access point. AP1 returns a probe response 46, as instructed by manager 34, to mobile station 32. Other access points do not respond. The mobile station then submits an authentication request 48, in accordance with the 802.11 standard. The authentication request specifies the BSSID which, as noted above, is shared by both AP1 and AP2. Therefore, the authentication request is, again, received by both AP1 and AP2, and forwarded to manager 34 at a forwarding step 50.

According to the 802.11 standard, after submitting request 48, the mobile station will expect to receive an acknowledgment (ACK) from the appropriate access point within a short period after transmitting the last bit of the uplink packet, typically within 10 µs for 802.11b or 16 µs for 802.11a or 802.11g. The method described above for expediting RSSI transmission and access point selection is useful in keeping the ACK response time within these limits. Still, it may sometimes occur that the acknowledgment is not sent in time. In this case, the mobile station will retransmit the association request until it receives a response. If no response is received within a predetermined time period, the mobile station will treat the association request as having failed. The cycle of forwarding association requests (and other messages) to manager 34 and waiting for the manager to respond may sometimes take longer than the 10-16 µs maximum set by the standard. Even when such a failure does not occur, the repeated retransmissions consume radio bandwidth in system 20 that could otherwise be used for data transmissions. A similar problem will occur after data messages and other sorts of uplink transmissions by mobile stations.

To alleviate this problem, upon receiving the authentication request at step 50, and before actually responding to the request, manager 34 may order access point AP1 to switch from its usual mobile station emulation (STA) mode to an access point (AP) mode. In AP mode, the access point acknowledges all uplink messages sent to its assigned BSSID. Therefore, when mobile station 32 retransmits the authentication request, AP1 will immediately return an acknowledgment to the mobile station, as required by the 802.11 standard. Alternatively, manager 34 may temporarily switch the MAC address of AP1 to correspond to the destination MAC address of the authentication request, which will likewise cause AP1 to acknowledge the retransmitted uplink message. AP1 subsequently returns (either autonomously or under instructions from manager 34) to its usual mobile station emulation mode. Similar techniques may be used in responding to data messages and other sorts of uplink messages from the mobile stations. Further details of these techniques of mode-switching or address-switching are described in the above-mentioned U.S. patent application Ser. No. 10/664,631.

In reply to authentication request 48, manager 34 generates the appropriate authentication response and passes response instructions to the selected access point (AP1), at a response generation step 52. AP1 then returns an authentication response 54 to mobile station 32, indicating that the mobile station is authorized to continue communications with the WLAN system.

The next step in the 802.11 communication management process is for mobile station 32 to submit an association request 56, asking to be associated with the BSS of access points 30. This request also specifies the BSSID shared by AP1 and AP2. The access points forward the association request to manager 34 for processing, at a forwarding step 58. If necessary, AP1 may be prompted to return an acknowledgment, as noted above. In reply to the association request, manager 34 generates the appropriate association response and passes response instructions to AP1, at a response generation step 60. AP1 accordingly returns an association response 62 to mobile station 32. The mobile station is now ready to begin data communications with system 20. Optionally, data communications may be preceded by additional management-related communication steps, such as exchange of EAPOL (Extensible Authentication Protocol Over LAN) packets between mobile station 32 and access points 30, as is known in the art. These additional steps are handled in similar manner to the association steps described above.

As a precursor to application-level data communications, mobile station 32 must typically ascertain the network address of the destination server or peer computer with which it wishes to communicate. The mobile station must also determine the MAC address of the destination or of the router through which packets to this destination should be sent (if the destination is outside the subnet in which the mobile station is located). Various protocols are known in the art for this purpose. Probably the most commonly-used protocol of this type is the well-known Address Resolution Protocol (ARP), which is described by Plummer in Request for Comments (RFC) 826 of the Internet Engineering Task Force (IETF), entitled "An Ethernet Address Resolution Protocol" (1982), which is incorporated herein by reference. Given a particular Internet Protocol (IP) destination address, ARP determines the MAC address to which packets to this IP address should be forwarded. Although ARP relates specifically to IP and Ethernet addressing, other, similar protocols are known in the art for resolving other network layer (Layer 3) and MAC layer (Layer 2) addressing schemes. Therefore, although certain techniques are described hereinbelow with reference to ARP, these techniques may be extended in a straightforward manner to other protocols and addressing schemes.

Mobile station 32 sends an ARP request 64 in order to determine the MAC address to which it should send data packets destined for a certain IP address. The ARP request is contained in a data frame sent over the WLAN, with a broadcast MAC address, as is known in the art. Therefore, both AP1 and AP2 (and other access points receiving the ARP request) forward the request to manager 34, at a forwarding step 66. Manager 34 generates ARP response instructions, at a response generation step 68. The ARP response to mobile station 32 informs the mobile station that the MAC address to which data packets to the desired IP address should be sent is the MAC address of the selected access point, AP1. Access point AP1 returns the appropriate ARP response 70 to the mobile station. All subsequent ARP requests by the mobile station, with respect to other IP addresses, receive the same response. In this manner, all entries in the ARP table of each mobile station 32 will be made to contain the same MAC address—that of the access point that was selected to serve the particular mobile station.

Having resolved the required MAC address, mobile station 32 can now send a data message 71 to this address. The data message comprises a packet, such as an IP packet with the appropriate IP destination address. It is encapsulated by the mobile station in a WLAN MAC. frame with the MAC destination address of AP1. When access point AP1 receives this message, it ascertains that the MAC destination address matches its own assigned address, and immediately sends an acknowledgment (ACK) 72 back to the mobile station. Other access points ignore message 71, since it is not addressed to their MAC addresses.

AP1 fragments and forwards the data message to manager 34 for processing, at an uplink forwarding step 73. The reason for fragmenting data messages at this step is to avoid clogging access to and from manager 34 via port 38. In order to meet the requirements of the 802.11 protocol, such as timely acknowledgment of uplink messages, manager 34 must be able to communicate with access points 30 with low latency—typically taking no more than about 10-16 μs for an exchange of messages between an access point and the manager. On the other hand, 802.11 WLAN and Ethernet LAN standards normally permit transmission of very long data frames, up to at least 1500 bytes. Even at a data rate of 1 Gbps on LAN 22, a frame of 1500 bytes takes 12 μs to transmit onto the LAN, and can block the path through switch 26 between an access point and manager 34 for more than twice that long. Thus, when one mobile station 32 transmits or receives a long data frame, it may delay communications between manager 34 and access points 30 for so long that the WLAN connections of other mobile stations will time out and fail.

Therefore, at step 73, AP1 breaks up the data message sent by mobile station 32 into short fragments, and encapsulates these fragments in a succession of Ethernet frames for transmission to manager 34 via port 38. The structure of such a frame is shown below in Table I:

TABLE I

MESSAGE ENCAPSULATION FRAME

| Ethernet header | Index | Payload | CRC |
| --- | --- | --- | --- |

Each frame generated by any access point 30 includes, as noted above, a standard Ethernet header with the MAC addresses of the access point and of manager 34 as source and destination addresses, respectively. An index follows, which indicates the position of the payload of the current frame in the overall data message, so as to aid manager 34 in identifying the beginning and end of the message and ordering the fragments for reassembly. The payload contains a fragment of the data message. Both the header and the payload of the data message sent by the mobile station are fragmented and transmitted in this manner. Typically, the length of the fragments is chosen so that each of the encapsulating frames is no longer than 10% of the maximum frame length permitted on LAN 22. To minimize latency of communications through port 38, the encapsulating frames may be even smaller, down to the smallest size permitted on LAN 22. Typically, the smallest frame size supported by Ethernet switches is 64 bytes, but some switches support "runt packets" of even smaller size. The data frame ends with a CRC field, as required by Ethernet standards.

Thus, it will be observed that each of the short message encapsulation frames created by AP1 is capable of being transmitted over a Gigabit Ethernet LAN in less than 1 μs. As a result, low-latency communication between the access points and manager 34 via port 38 is assured, and the above-mentioned timing requirements of the 802.11 protocol can be met. In the case of a 100 Mbps LAN, the transmission time of a 64 byte frame will be about 5 μs, and typical switch latencies are in the range of 6-11 μs, so that meeting 802.11 timing requirements is more difficult. The 802.1p-based prioritization scheme described above can be useful in expediting the transmission of RSSI reports and other control-related communications between the manager and access points, relative to data communication with the mobile stations. When necessary, the access points and manager may drop data frames in order to permit immediate transmission of control-related frames.

Alternatively, when switches 24 and 26 comprise Layer 3 switches, such as IP routers, AP1 may encapsulate the message fragments in a succession of IP packets, as shown in Table II:

TABLE II

MESSAGE ENCAPSULATION PACKET

| Ethernet header | IP header | Index | Payload | CRC |
| --- | --- | --- | --- | --- |

The IP header contains the IP address of the access point as the IP source address, and the IP address of manager 34 as the IP destination address. The IP address of the access point is used only for communication between the access point and manager 34 and is not available to other entities on LAN 22. Each packet is contained in an Ethernet data frame or other Layer 2 data frame, as is known in the art. In order to avoid the need for switches 24 and 26 to direct ARP requests to the IP addresses of access points 30 in order to determine the corresponding MAC addresses for routing purposes, the ARP tables of the switches may be pre-programmed with the appropriate IP and MAC addresses. For example, manager 34 may use the Simple Network Management Protocol (SNMP) to program the switches. Alternatively, manager 34 may use ARP proxy techniques (also known as "ARP spoofing") for this purpose. These and other suitable methods of router programming are well known in the art.

Although the fragmentation of data messages sent to and from mobile stations 32 may reduce the throughput of LAN 22, due to the increased transmission overhead that is incurred, the net loss of throughput is negligible from the point of view of WLAN system 20. The limiting factor in the WLAN throughput is not the net rate of data transmission on LAN 22 (which operates at 1 Gbps or greater), but rather the data rate in transmissions over the air between access points 30 and mobile stations 32, which is limited by present standards to less than 100 Mbps.

Returning now to FIG. 2B, manager 34 receives and processes the message forwarded by AP1, at a message processing step 74. As noted above, the message is typically fragmented over a succession of data frames or packets. Manager 34 reassembles the original data message from the encapsulation payloads in the proper order, using the index inserted by the access point. Once the manager has reassembled the message, it reads the IP destination address (or other network address) in the reassembled packet header. The header tells manager 34 whether the data message should be transmitted to another node in system 20, such as another one of mobile stations 32 or fixed computers 28, or should be routed or bridged out of system 20, via gateway 29, for example.

Unless the message from mobile station 32 is directed to another one of the mobile stations in system 20, manager 34 transmits the reassembled message to its destination via port 36 of switch 26. The manager uses the MAC address that is associated with port 36 as the Ethernet source address of the transmission. As a result, other nodes on LAN 22 will learn to associate the MAC address of manager 34 on port 36 with the IP address of the mobile station sending the message. The other nodes will then return any reply to this same MAC address. Since port 38 is reserved for low-latency communications between the manager and access points, port 36 may operate as a conventional, high-throughput Ethernet port, without special fragmentation requirements.

Eventually, after sending the reassembled data packet to the appropriate destination at step 74, manager 34 receives a data response 75 (or other incoming data packet) directed to the IP address of mobile station 32. The manager fragments the data packet and encapsulates the fragments in a sequence of short Ethernet frames or IP packets, at a downlink forwarding step 76, in a manner similar to that described above at step 73. It passes these frames through port 38, via switch 26, to the selected access point, AP1. If manager 34 needs to send a high-priority frame (regarding acknowledgment of a new uplink message from one of the mobile stations, for example) to any of the access points, the manager may simply send the high-priority frame in the midst of the sequence without ill effect. Upon receiving the encapsulating frames or packets, AP1 reassembles the encapsulated payloads and transmits a data response 77 to the appropriate mobile station. The mobile station may send additional data messages, including further ARP requests, which are handled in the manner described above.

Manager 34 may, from time to time, hand over a given mobile station 32 from one access point 30 to another, i.e., it may change the access point that is assigned to serve the mobile station. The handover decision is typically based on the RSSI values transmitted by the various access points to the manager, as described above. Typically, if the RSSI value of another access point, such as AP2, is significantly stronger than that of AP1, manager 34 will decide to make the handover. The change in relative signal strengths between AP1 and AP2 may be due to movement of the mobile station within the service region of system 20, for example, or due to other changes, such as movement of people or objects in the service region. Manager 34 may also decide to change the serving access point for a given mobile station based on other considerations, such as load balancing or network management constraints.

In order to hand over mobile station 32 from AP1 to AP2, the ARP table held by the mobile station must be modified to point to the WLAN MAC address of AP2, rather than AP1. ARP spoofing may be used for this purpose, as described in detail in the above-mentioned U.S. patent application Ser. No. 10/664,631. Briefly, manager 34 instructs AP1 to send a spoofed ARP response to mobile station 32, instructing the mobile station to replace all the entries in its ARP table with new entries containing the MAC address of AP2. Thus, the next time mobile station 32 sends a data message, the MAC destination address of the data message will be the MAC address of AP2. As a result, AP1 will ignore the message, while AP2 sends ACK 72, forwards the message to manager 34 at step 73, and returns the response at step 77, as described above.

Although the operation of WLAN system 20 is described hereinabove with reference to the 802.11 family of standards, using certain protocols and terminology taken from these and other standards, the principles of the present invention may similarly be applied in wireless LANs of other types, based on other standards and communication protocols. Similarly, although LAN 22 is described hereinabove as an Ethernet LAN, other types of wired LANs may be used instead to connect access points 30 to manager 34, as long as the LAN speed is sufficient to meet the timing requirements of the applicable WLAN protocol. In addition, the principles of the present invention may be applied in wireless personal area networks (PANs), as defined by IEEE Standard 802.15, including ultra-wide band (UWB) PANs.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for mobile communication, comprising:
   a switch, having a plurality of ports for connection to a wired local area network (LAN);
   a plurality of access points, which are arranged in a wireless local area network (WLAN) to communicate over the air in accordance with a predefined WLAN protocol on a common frequency channel with a mobile station using a common basic service set identification (BSSID) for all the access points, and which are coupled by the LAN to the switch so that upon receiving at one or more of the access points an uplink packet transmitted over the WLAN by the mobile station on the common frequency channel, the one or more of the access points convey messages responsively to the uplink packet over the LAN to the switch; and
   a manager node, which is coupled to the switch so as to receive the messages and is adapted to process the messages so as to select one of the access points to respond to the uplink packet, and to send an instruction via the switch to the selected one of the access points to transmit to the mobile station a response to the uplink packet within a time limit specified by the WLAN protocol.

2. The apparatus according to claim 1, wherein the access points have respective service areas, and are arranged so that the service areas substantially overlap.

3. The apparatus according to claim 1, wherein the access points are configured to communicate with the mobile station substantially in accordance with IEEE Standard 802.11.

4. The apparatus according to claim 1, wherein the LAN is an Ethernet LAN.

5. The apparatus according to claim 1, wherein the LAN is characterized by a data transmission rate of at least 1 Gbps.

6. The apparatus according to claim 1, wherein the LAN is characterized by a data transmission rate that is substantially less than 1 Gbps.

7. The apparatus according to claim 1, wherein the manager node has an address on the LAN, and wherein the access points are adapted to convey the messages over the LAN in the form of data frames directed to the address of the manager node.

8. The apparatus according to claim 7, wherein the access points are configured to communicate over the LAN exclusively with the manager node.

9. The apparatus according to claim 7, wherein the uplink packet comprises an uplink data packet, and wherein the access points are configured to fragment the uplink data packet among a succession of the data frames for conveyance over the LAN via the switch to the manager node.

10. The apparatus according to claim 9, wherein the access points are operative to fragment the uplink data packet so that the data frames have a length that is no more than 10% of a maximum frame length permitted on the LAN.

11. The apparatus according to claim 9, wherein the access points are operative to fragment the uplink data packet so that the data frames have a length that is equal to a minimum frame length permitted on the LAN.

12. The apparatus according to claim 9, wherein the uplink data packet comprises a destination address, and wherein the manager node is adapted to reassemble the uplink data packet from the succession of the data frames, and to convey the reassembled packet via the switch over the LAN to the destination address.

13. The apparatus according to claim 12, wherein the manager node is connected to first and second ports among the plurality of the ports of the switch, and is configured to receive the data frames from the access points through the first port and to convey the reassembled packet to the LAN via the second port.

14. The apparatus according to claim 13, wherein the manager node is further configured to receive a downlink data packet from the LAN via the second port, and to fragment the downlink data packet into a further succession of the data frames and to convey the further succession of the data frames via the first port to the selected one of the access points, which is operative to reassemble the downlink data packet for transmission over the WLAN to the mobile station.

15. The apparatus according to claim 9, wherein the address of the manager node on the LAN comprises a Layer 3 address, and wherein each of the succession of the data frames among which the uplink data packet is fragmented comprises a Layer 3 encapsulating packet, having a destination address corresponding to the Layer 3 address of the manager node.

16. The apparatus according to claim 1, wherein the messages conveyed by the access points responsively to the uplink packet comprise an indication of a strength of an uplink signal, conveying the uplink packet, received respectively by each of the one or more of the access points, and wherein the manager node is adapted to select, responsively to the indication and prior to receiving the messages from all of the one or more of the access points, the one of the access points to respond to the uplink packet.

17. The apparatus according to claim 16, wherein the access points are adapted to set, responsively to the strength of the uplink signal, a priority indicator in the messages to be conveyed over the LAN so as to cause the switch to deliver a first message indicating a strong uplink signal before delivering a second message indicating a weak uplink signal.

18. The apparatus according to claim 16, wherein the access points are adapted, responsively to the strength of the uplink signal, to delay transmission of some of the messages over the LAN, so that a first message indicating a strong uplink signal is transmitted with a smaller delay than a second message indicating a weak uplink signal.

19. Apparatus for mobile communication, comprising:
a switch, having a plurality of ports for connection to a wired local area network (LAN);
a plurality of access points, which are arranged in a wireless local area network (WLAN) to communicate over the air with a mobile station, and which are coupled by the LAN to the switch so that upon receiving at one or more of the access points an uplink message transmitted over the WLAN by the mobile station, the one or more of the access points convey the uplink message over the LAN to the switch; and
a manager node, which is connected to first and second ports among the plurality of the ports of the switch, and is configured to receive uplink messages from the access points exclusively through the first port and to convey the uplink messages exclusively via the second port over the LAN to respective destination addresses of the message, wherein the manager node has first and second addresses on the LAN, which are respectively associated with the first and second ports, and wherein the access points are adapted to convey the uplink messages over the LAN in the form of data frames directed to the first address.

20. The apparatus according to claim 19, wherein the access points are configured to communicate over the LAN exclusively with the manager node via the first port in response to uplink messages received from the mobile station.

21. The apparatus according to claim 19, wherein the access points are configured to communicate with the mobile station substantially in accordance with IEEE Standard 802.11.

22. The apparatus according to claim 19, wherein the uplink message comprises a data packet, and wherein the access points are adapted to fragment the uplink data packet among a succession of the data frames for conveyance over the LAN to the first address, and wherein the manager node is adapted to reassemble the data packet from the succession of the data frames, and to convey the reassembled data packet via the second port over the LAN to the destination address, using the second address as a source address.

23. The apparatus according to claim 22, wherein the access points are operative to fragment the data packet so that the data frames have a length that is no more than 10% of a maximum frame length permitted on the LAN.

24. The apparatus according to claim 22, wherein the access points are operative to fragment the data packet so that the data frames have a length that is equal to a minimum frame length permitted on the LAN.

25. The apparatus according to claim 22, wherein the address of the manager node on the LAN comprises a Layer 3 address, and wherein each of the succession of the data frames among which the uplink data packet is fragmented comprises a Layer 3 encapsulating packet, which is addressed to the Layer 3 address of the manager node.

26. The apparatus according to claim 19, wherein the manager node is further configured to receive a downlink message from the LAN via the second port, and to convey the downlink message via the first port to one of the access points, which is operative to transmit the downlink message over the WLAN to the mobile station.

27. A method for mobile communication, comprising:
arranging a plurality of access points in a wireless local area network (WLAN) to communicate over the air with a mobile station in accordance with a predefined WLAN protocol using a common basic service set identification (BSSID) for all the access points;
receiving at one or more of the access points an uplink packet transmitted over the WLAN by the mobile station using the common BSSID;
conveying messages responsively to the uplink packet from the one or more of the access points over a wired local area network (LAN) linking the access points to a manager node;
processing the messages at the manager node so as to select one of the access points to respond to the uplink packet, and conveying a response instruction from the manager node to the selected one of the access points; and
transmitting from the selected one of the access points to the mobile station responsively to the response instruction a response to the uplink packet within a time limit specified by the WLAN protocol.

28. The method according to claim 27, wherein the access points have respective service areas, and wherein arranging the plurality of the access points comprises arranging the access points so that the service areas substantially overlap.

29. The method according to claim 27, wherein arranging the plurality of the access points comprises arranging the access points to communicate with the mobile station substantially in accordance with IEEE Standard 802.11.

30. The method according to claim 27, wherein the LAN is an Ethernet LAN.

31. The method according to claim 30, wherein conveying the messages comprises sending the messages over the Ethernet LAN at a data transmission rate of at least 1 Gbps.

32. The method according to claim 30, wherein conveying the messages comprises sending the messages over the Ethernet LAN at a data transmission rate that is substantially less than 1 Gbps.

33. The method according to claim 27, wherein the manager node has an address on the LAN, and wherein conveying the messages comprises transmitting the messages over the LAN in the form of data frames directed to the address of the manager node.

34. The method according to claim 33, wherein the access points are configured to communicate over the LAN exclusively with the manager node.

35. The method according to claim 33, wherein receiving the uplink packet comprises receiving an uplink data packet sent by the mobile station, and wherein transmitting the messages comprises fragmenting the uplink data packet among a succession of the data frames for conveyance over the LAN via the switch to the manager node.

36. The method according to claim 35, wherein fragmenting the uplink data packet comprises generating the data frames with a length that is no more than 10% of a maximum frame length permitted on the LAN.

37. The method according to claim 35, wherein fragmenting the uplink data packet comprises generating the data frames with a length that is equal to a minimum frame length permitted on the LAN.

38. The method according to claim 35, wherein the uplink data packet comprises a destination address, and comprising reassembling the uplink data packet at the manager node from the succession of the data frames, and conveying the reassembled packet over the LAN to the destination address.

39. The method according to claim 38, wherein the LAN comprises a switch, and the manager node is connected to first and second ports of the switch, and wherein transmitting the messages comprises transmitting the data frames from the access points through the first port to the manager node, and wherein conveying the reassembled packet comprises transmitting the reassembled packet to the LAN via the second port.

40. The method according to claim 39, and comprising:
receiving at the manager node a downlink data packet from the LAN via the second port;
fragmenting the downlink data packet into a further succession of the data frames;
conveying the further succession of the data frames via the first port to the selected one of the access points; and
reassembling the downlink data packet at the selected one of the access points for transmission over the WLAN to the mobile station.

41. The method according to claim 35, wherein the address of the manager node on the LAN comprises a Layer 3 address, and wherein each of the succession of the data frames among which the uplink data packet is fragmented comprises a Layer 3 encapsulating packet, having a destination address corresponding to the Layer 3 address of the manager node.

42. The method according to claim 27, wherein conveying the messages comprises conveying an indication of a strength of an uplink signal, conveying the uplink packet, received respectively by each of the one or more of the access points, and wherein processing the messages comprises selecting at the manager node, responsively to the indication and prior to receiving the messages from all of the one or more of the access points, the one of the access points to respond to the uplink packet.

43. The method according to claim 42, wherein conveying the indication comprises setting, responsively to the strength of the uplink signal, a priority indicator in the messages to be conveyed over the LAN so as to cause the switch to deliver a first message indicating a strong uplink signal before delivering a second message indicating a weak uplink signal.

44. The method according to claim 42, wherein conveying the indication comprises delaying, responsively to the strength of the uplink signal, transmission of some of the messages, so that a first message indicating a strong uplink signal is transmitted with a smaller delay than a second message indicating a weak uplink signal.

45. A method for mobile communication, comprising:
coupling a manager node to first and second ports among a plurality of ports of a switch in a wired local area network (LAN);
assigning to the manager node first and second addresses on the LAN, which are respectively associated with the first and second ports;
arranging a plurality of access points in a wireless local area network (WLAN) to communicate over the air with a mobile station;
receiving at one or more of the access points an uplink message transmitted over the WLAN by the mobile station, the uplink message containing a destination address;
passing the uplink message from the one or more of the access points over the LAN to the manager node, in the form of one or more data frames directed to the first address, via the first port of the switch, which is configured to receive uplink messages from the access points exclusively through the first port; and
conveying the uplink message from the manager node via the second port over the LAN to the destination address, wherein the switch is configured to convey the uplink messages to respective destination addresses exclusively via the second port.

46. The method according to claim 45, wherein arranging the plurality of the access points comprises configuring the access points to communicate over the LAN exclusively with the manager node via the first port in response to uplink messages received from the mobile station.

47. The method according to claim 45, wherein arranging the plurality of the access points comprises arranging the access points to communicate with the mobile station substantially in accordance with IEEE Standard 802.11.

48. The method according to claim 45, wherein the uplink message comprises an uplink data packet, and wherein passing the uplink message comprises fragmenting the upstream data packet among a succession of the data frames for conveyance over the LAN to the MAC address, and wherein conveying the uplink message comprises reassembling the data packet from the succession of the data frames, and conveying the reassembled packet via the second port over the LAN to the destination address, using the second address as a source address.

49. The method according to claim 48, wherein fragmenting the uplink data packet comprises generating the data frames with a length that is no more than 10% of a maximum frame length permitted on the LAN.

50. The method according to claim 48, wherein fragmenting the uplink data packet comprises generating the data frames with a length that is equal to a minimum frame length permitted on the LAN.

51. The method according to claim 48, wherein the address of the manager node on the LAN comprises a Layer 3 address, and wherein each of the succession of the data frames among which the uplink data packet is fragmented comprises a Layer 3 encapsulating packet, which is addressed to the Layer 3 address of the manager node.

52. The method according to claim 45, and comprising:
  receiving at the manager node a downlink message from the LAN via the second port;
  conveying the downlink message via the first port from the manager node to one of the access points; and
  transmitting the downlink message over the WLAN from the one of the access points to the mobile station.

\* \* \* \* \*